US011383437B2

(12) United States Patent
Hu

(10) Patent No.: US 11,383,437 B2
(45) Date of Patent: Jul. 12, 2022

(54) HYBRID MANUFACTURING APPARATUS

(71) Applicant: Dongming Hu, Knoxville, TN (US)

(72) Inventor: Dongming Hu, Knoxville, TN (US)

( * ) Notice: Subject to any disclaimer, the term of this patent is extended or adjusted under 35 U.S.C. 154(b) by 0 days.

(21) Appl. No.: 16/591,410

(22) Filed: Oct. 2, 2019

(65) Prior Publication Data
US 2020/0101662 A1 Apr. 2, 2020

Related U.S. Application Data

(63) Continuation-in-part of application No. PCT/IB2019/058402, filed on Oct. 2, 2019.
(Continued)

(51) Int. Cl.
*B29C 64/209* (2017.01)
*B29C 64/245* (2017.01)
(Continued)

(52) U.S. Cl.
CPC .......... *B29C 64/209* (2017.08); *B29C 64/245* (2017.08); *B29C 64/277* (2017.08);
(Continued)

(58) Field of Classification Search
CPC ..... B29C 4/209; B29C 64/106; B29C 64/118; B29C 64/188; B29C 64/20; B29C 64/209;
(Continued)

(56) References Cited

U.S. PATENT DOCUMENTS 5,936,861 A * 8/1999 Jang ................. B33Y 70/00
700/98
6,129,872 A * 10/2000 Jang ................. B29C 48/17
264/75
(Continued)

FOREIGN PATENT DOCUMENTS

EP         3130289 A1   2/2017
WO    WO2016108154 A1   7/2016

OTHER PUBLICATIONS

Gibson, Ian, et al. Additive Manufacturing Technologies. [ElectronicResource] : 3D Printing, Rapid Prototyping, and Direct Digital Manufacturing. New York, NY : Springer New York : Imprint: Springer, 2015., 2015. EBSCOhost ("GIBSON"). (Year: 2015).*
"3D-Printed masks as a new approach for immobilization in radiotherapy—a study of positioning accuracy", https://www.ncbi.nlm.nih.gov/pmc/articles/PMC5814227/, Jan. 19, 2018.
"Towards 3D printed multifunctional immobilization for proton therapy: Initial materials characterization", https://pdfs.semanticscholar.org/578d/86f50fade8d6e58f433ed9c3f23c, Oct. 2016.
(Continued)

*Primary Examiner* — Joseph S Del Sole
*Assistant Examiner* — Manley L Cummins, IV

(57) ABSTRACT

A hybrid manufacturing apparatus utilizing both additive and subtractive manufacturing processes has a cutting mechanism, a magazine, and a deposition nozzle. A cutting mechanism engages and modifies material fed from a magazine, the finished material of this process to be positioned by a deposition nozzle. More specifically, the cutting mechanism provides a chamber supporting an inlet, an outlet, and at least one cutting head. The inlet receives fresh material, the cutting head is positioned within the chamber to create the desired contours in or on the material, and the material then exits the chamber via the outlet to be deposited according to instructions extracted from a digital model in a form of numerical control (NC) programming language. This model is natively subdivided into individual constructs each defining a set of values to guide creation of corresponding physical sections, and the placement thereof.

11 Claims, 13 Drawing Sheets

Related U.S. Application Data

(60) Provisional application No. 62/739,960, filed on Oct. 2, 2018.

(51) Int. Cl.

| | | |
|---|---|---|
| *B29C 64/277* | (2017.01) | |
| *B29C 64/30* | (2017.01) | |
| *G05B 19/4099* | (2006.01) | |
| *B33Y 30/00* | (2015.01) | |
| *B29C 64/118* | (2017.01) | |
| *B33Y 50/02* | (2015.01) | |

(52) U.S. Cl.
CPC .......... *B29C 64/30* (2017.08); *G05B 19/4099* (2013.01); *B29C 64/118* (2017.08); *B33Y 30/00* (2014.12); *B33Y 50/02* (2014.12); *G05B 2219/49011* (2013.01)

(58) Field of Classification Search
CPC ..... B29C 64/245; B29C 64/277; B29C 64/30; B29C 64/379; B33Y 10/00; B33Y 30/00; B33Y 40/00; B33Y 50/02; B33Y 80/00; G05B 19/4099; G05B 2219/49011
See application file for complete search history.

(56) References Cited

U.S. PATENT DOCUMENTS

| | | | |
|---|---|---|---|
| 2003/0179252 A1 | 9/2003 | Nakamura | |
| 2005/0194401 A1* | 9/2005 | Khoshnevis | ........ E04G 21/0463 |
| | | | 222/100 |
| 2012/0220022 A1 | 8/2012 | Ehrlich et al. | |
| 2014/0291886 A1* | 10/2014 | Mark | ................... B29C 64/209 |
| | | | 264/163 |
| 2014/0330417 A1 | 11/2014 | Keane | |
| 2015/0140158 A1* | 5/2015 | Cervantes | ............. B29C 64/209 |
| | | | 425/461 |
| 2016/0136897 A1* | 5/2016 | Nielsen-Cole | ........ B29C 64/218 |
| | | | 425/131.1 |
| 2017/0028638 A1* | 2/2017 | Evans | ................... B29C 70/382 |
| 2017/0182698 A1* | 6/2017 | Susnjara | ............... B29C 64/209 |
| 2018/0001565 A1 | 1/2018 | Hocker | |
| 2018/0110901 A1 | 4/2018 | Lewis et al. | |
| 2018/0326732 A1 | 11/2018 | Ko et al. | |

OTHER PUBLICATIONS

Towards 3D printed multifunctional immobilization for proton therapy: Initial materials characterization., https://www.semanticscholar.org/paper/Towards-3D-printed-multifunctional-immobilization-Michiels-D%E2%80%99Hollander/578d86f50fade8d6e58f4-33ed9c3f23c51450826?p2df, (2016).

* cited by examiner

Exemplary PSID: (P)atient (S)etup and (I)mmobilization (D)evice

HYBRID MANUFACTURING APPARATUS The current application claims a priority to the U.S. Provisional Patent application Ser. No. 62/739,960 filed on Oct. 2, 2018.

FIELD OF THE INVENTION

The present invention relates generally to the field of advanced manufacturing techniques. More specifically, the present invention describes a system and method for combining additive and subtractive manufacturing processes.

BACKGROUND OF THE INVENTION

Radiotherapy (RT) is a cancer treatment method to shrink tumors and kill cancer cells by using high energy radiation in form of photons (X-Rays, Gamma Rays) and charged particles (electrons and protons). According to American Cancer Society, more than 60% of the cancer patients receive RT at some time during their course of treatment. To minimize the damage to the surrounding healthy tissues, RT treatment is planned one fraction (some cases two) a day, 5 days a week for 2 to 10 consecutive weeks. In each faction, beam is shaped and delivered in different fields (angles), providing a more concentrated dose on the tumor than in the surroundings. Most important, RT needs to deliver accurate radiation dose to the accurate tumor location with accurate orientation following the treatment plan. This requires the position and orientation between the tumor and the beam to be aligned and maintained precisely during each fraction and repeated in every fraction. Patient setup procedure is performed in every fraction to setup the patient in the treatment position on the couch. For each visit, patient may stay in the treatment room for 15-30 minutes, but only 1-5 minutes are under beam treatment. The alignment is carried out by shifting couch based on in-room imagining guidance of 2D X-Ray, 3D Cone Beam Computed Tomography (CBCT), or even conventional CT scan. The imaging guided patient positioning technology can align the tumor and the beam isocenter theoretically with sub-millimeter accuracy. However, after patient setup, it solely relies on patient with the help of a Patient Setup and Immobilization Device (PSID) to keep the alignment during the treatment. Any motions cause concerns on intrafraction position uncertainty may require additional imaging and couch correction. The commonly used PSIDs either provide support to a patient's body to reduce the possibility of patient motion or apply direct immobilization to a target area. With little or limited personalization, the setup devices by themselves cannot reduce position uncertainty to a desired level. The immobilization devices such as thermal masks or head rings, by applying simple technologies that sacrifice patients' comfort, cause various levels of stress and anxiety. Given the naturally stressed state of most patients undergoing RT, this may result in a horrifying treatment experience for a patient. Even with strictest immobilization, the inter-fraction position uncertainties are still in the range of several millimeters.

The ideal PSID should secure patient and constrain motion in patient's comfort position and maintain the position integrity throughout treatment course. To solve the problems in commonly used PSIDs, the first part of the present invention focuses on developing an advanced manufacturing technology for rapid fabrication of personalized, up to whole-body size (e.g. 2 m×0.5 m×0.2 m) PSIDs used in radiation therapy. The fabrication of large-scale personalized PSIDs in 2-3 hours within a patient's first visit is greatly preferred by RT providers. To meet the requirements of high build rate and customization, an innovative process and corresponding apparatus are provided. The technology presented herein achieves material deposition rates up to thousands of times the volumes of traditional 3D printing and is capable of handling materials with different densities (transparent to radiation, variable water density, etc.) for tailored applications.

DETAIL DESCRIPTIONS OF THE INVENTION

Figure 1:
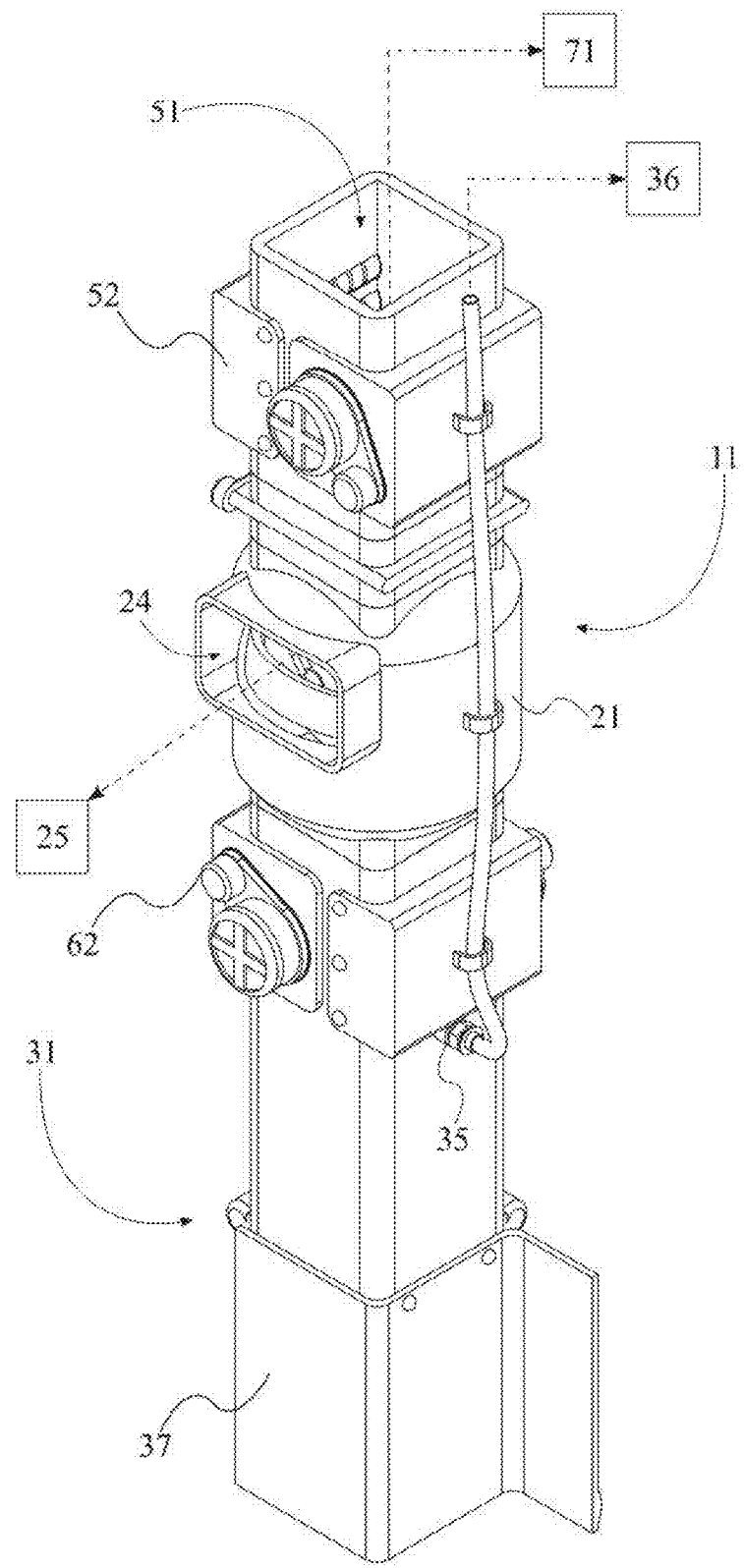
FIG. 1 is a top-front-left perspective view of the present invention.
Figure 2:
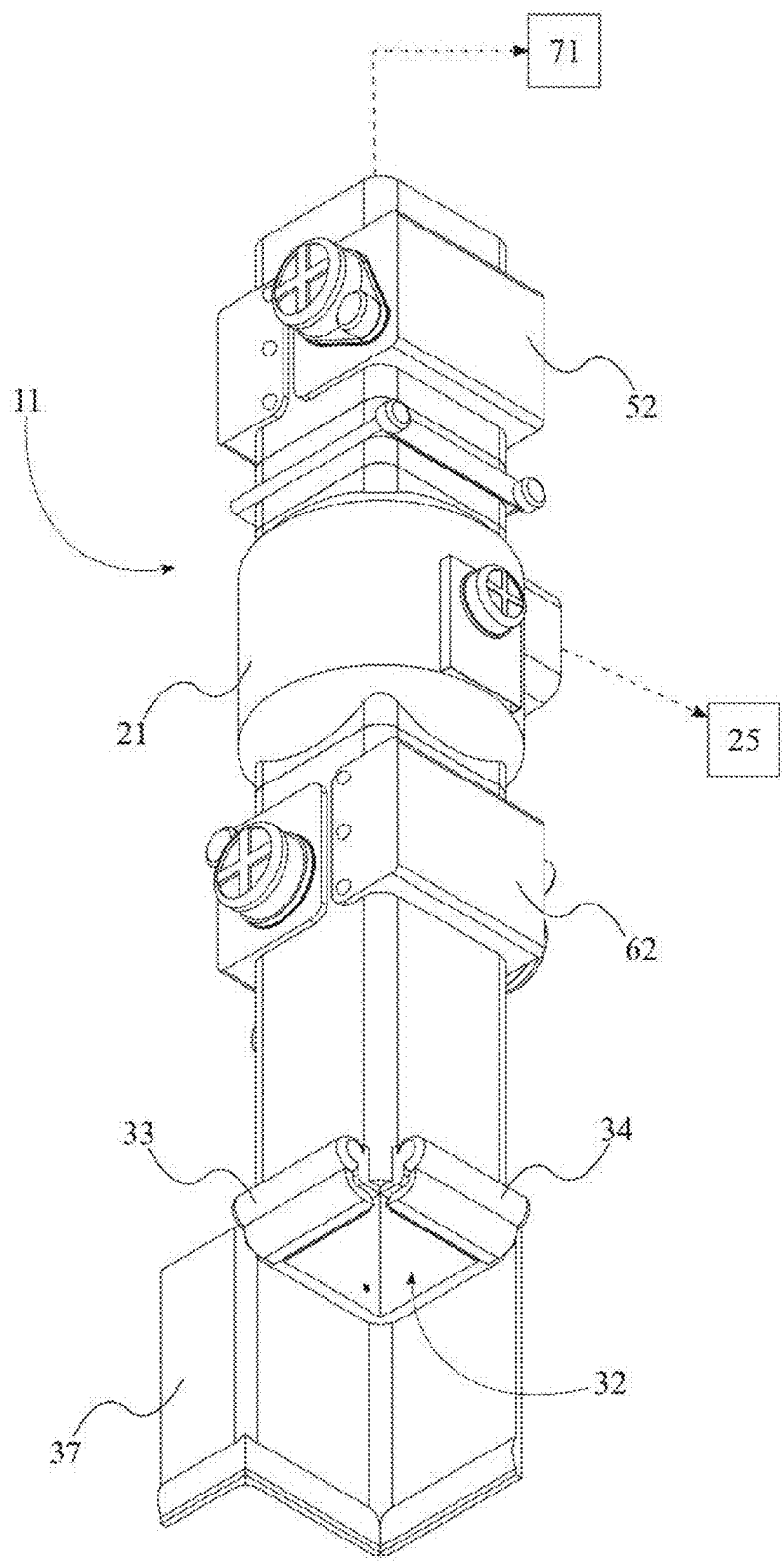
FIG. 2 is a bottom-right-rear view of the present invention.

All illustrations of the drawings are for the purpose of describing selected versions of the present invention and are not intended to limit the scope of the present invention.

In reference to FIG. 1 through FIG. 12, the present invention aims to provide a means and method for the accelerated manufacture of accurate, large-scale products based on a novel combination of a pixel column model type, additive manufacturing, and subtractive manufacturing methods. To elaborate, the pixel column model defines a digital construct consisting of a three-dimensional collection of elongated entities defined by a height and a surface contour conforming to a proto-model of dissimilar complexity. It is understood that the proto-model may comprise stereolithographic, point-field, surface mesh, or any other form or variety of model as may be utilized by an individual of regular skill. The conversion of the proto-model to the pixel column model defines a series of approximations; wherein the contours of the proto-model are matched by planes and vertices of best-fit by the corresponding features of the pixel column. In the preferred implementation of this conversion, the pixel column model will ultimately define a contiguous manifold surface with minimal deviation from the proto-model. This method of approximation is to be understood as a standard component of any modeling process—digital models in general are themselves an approximation of real-world objects based on the resolution of a given model. The benefits of the segmentation of a given proto-model into the pixel column format are that any portion of the pixel column may be further separated into distinct, limited profiles to which toolpaths may be written. These toolpaths may further comprise any known format or combination of formats related to numerical control language, i.e. written instructions for movement of a machine in a given space.

Specific consideration is given to the application of this technology in the field of radiotherapy treatment. More specifically, the present invention may be applied in the creation of personalized immobilization devices utilized to maintain patient position and beam alignment during repeated applications of radiotherapy (referred to as 'fractions' of a course of treatment). Alignment of the beam to a target area may initially be achieved with satisfactory deviation via the use of on-site guidance imaging, but maintenance of this alignment relies heavily on an immobile patient—even slight motions provide cause to halt treatment for further re-imaging and re-alignment before treatment may resume safely. Personal immobility devices as presently produced and employed are costly and slow to manufacture, requiring a patient to be scanned prior to the beginning of a course of treatment with sufficient lead time to create a suitable immobility device via conventional manufacturing processes. The present invention would permit a treatment facility to scan a patient, produce a suitable immobility device, and begin treatment within hours instead of days, increasing the accessibility of such treatments while reducing costs associated with production lead-times and re-imaging related to non-bespoke immobility devices.

Figure 3:
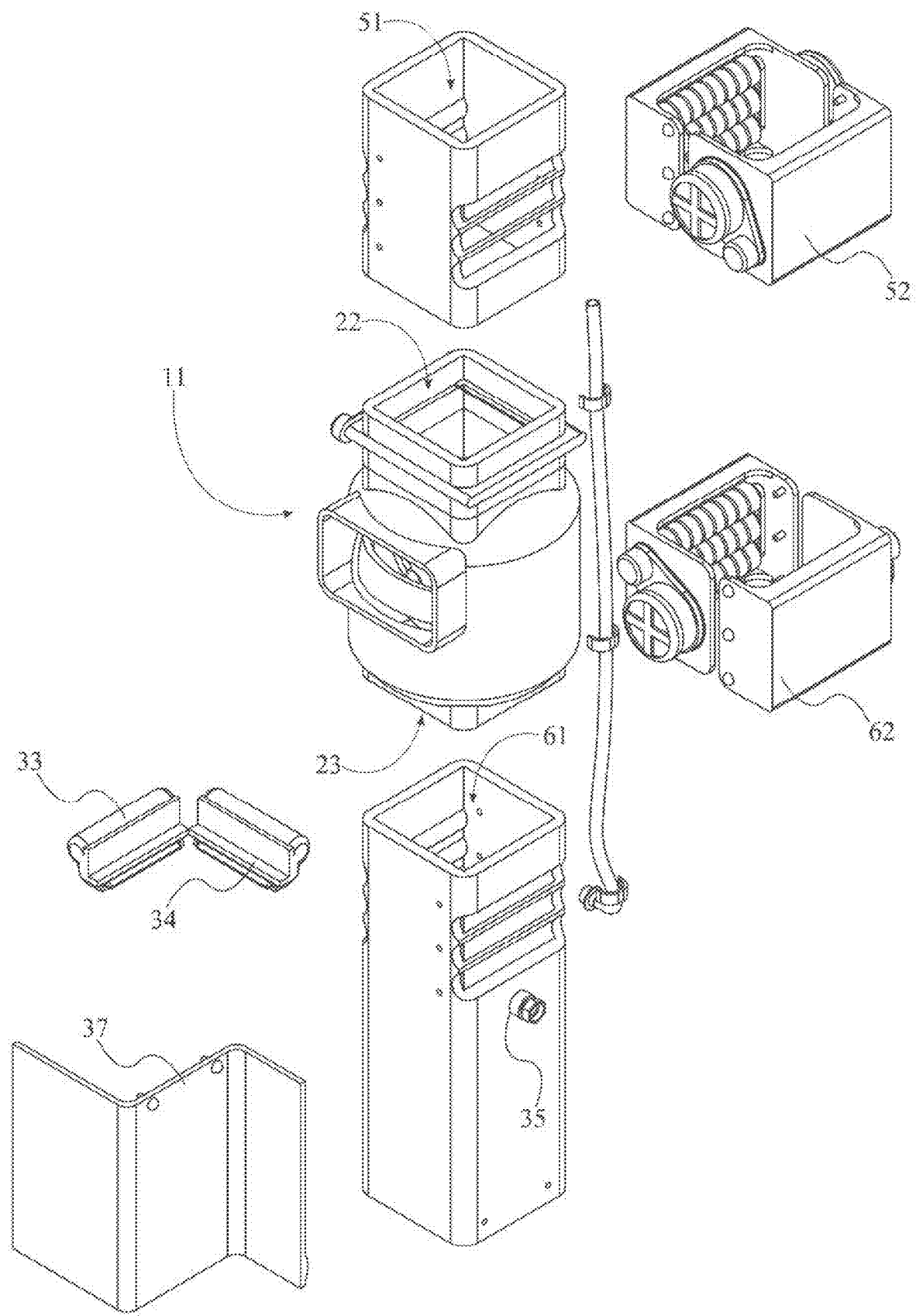
FIG. 3 is an exploded perspective view of the present invention.
Figure 4:
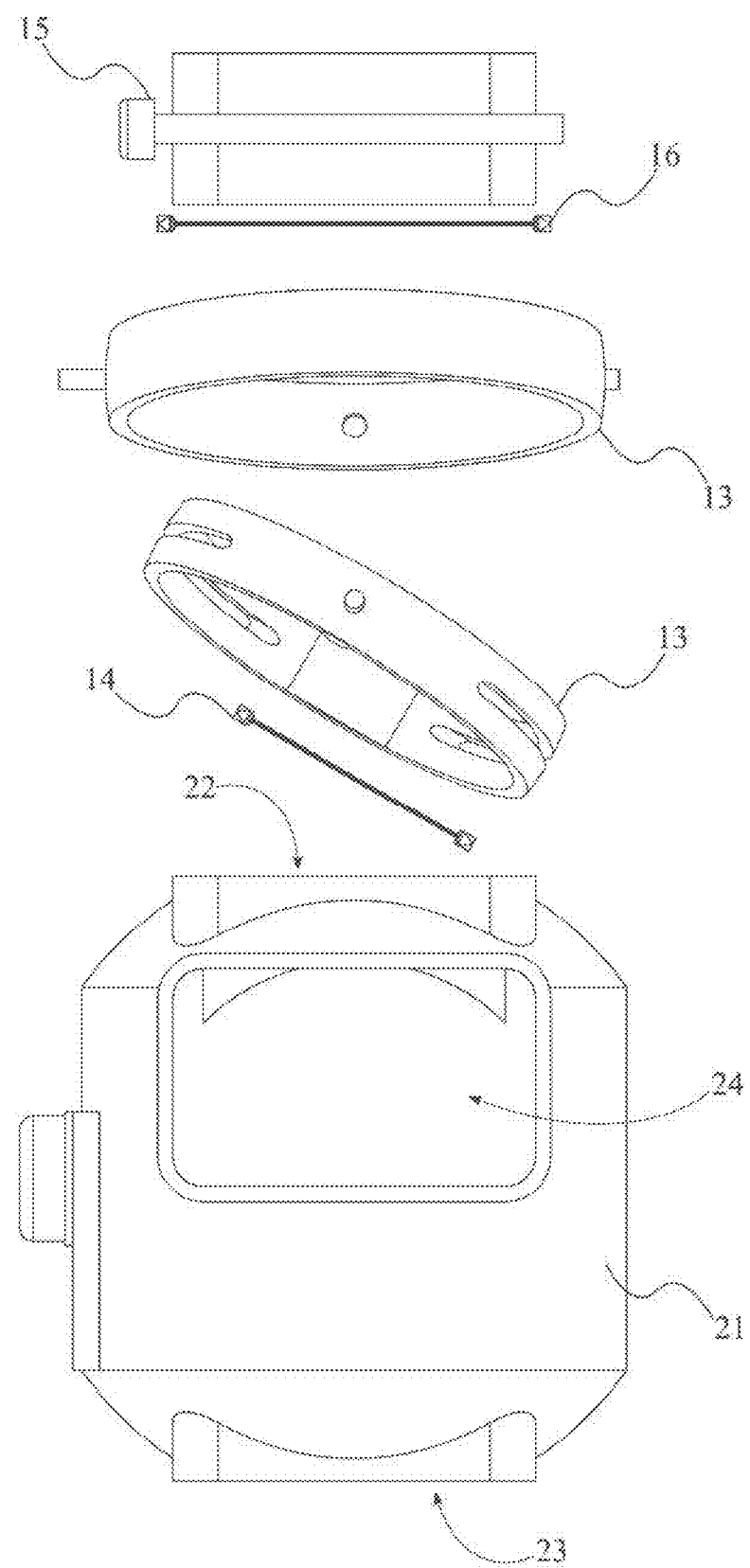
FIG. 4 is an exploded elevational view of a cutting mechanism of the present invention.
Figure 5:
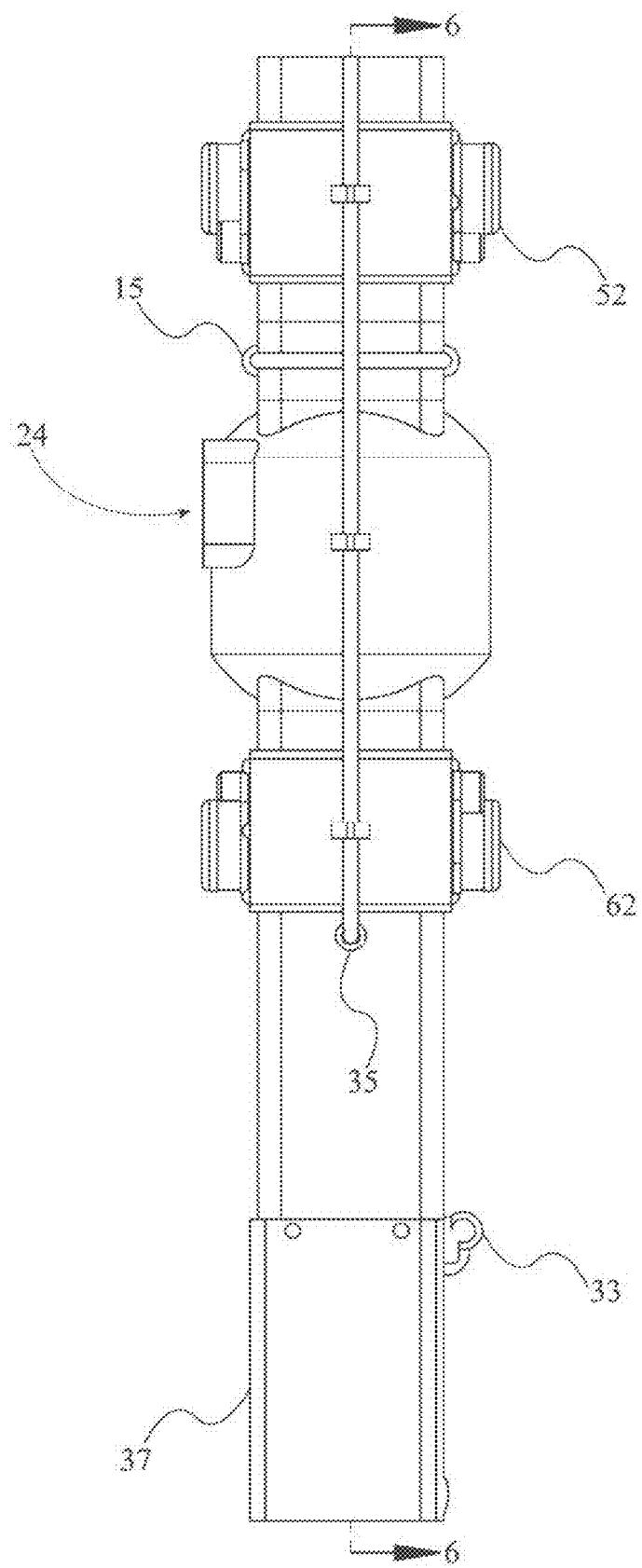
FIG. 5 is a left-side elevational view of the present invention.
Figure 6:
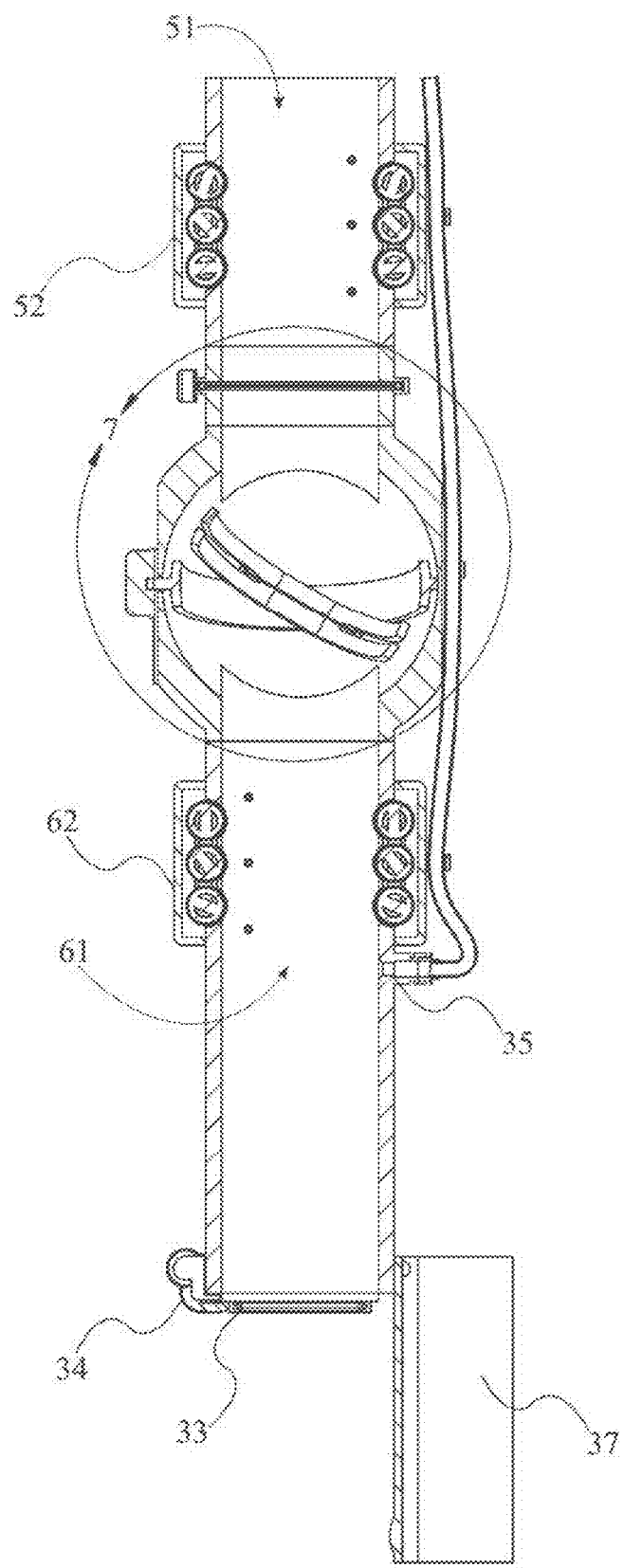
FIG. 6 is section view taken along line 6-6 in FIG. 5.

In reference to FIG. 1 and FIG. 3, in the preferred embodiment of the present invention, the hybrid manufacturing apparatus comprises at least one cutting mechanism 11, at least one magazine 71, and at least one deposition nozzle 31. The cutting mechanism 11 is contemplated to include various means of severing a segment of material fed from the magazine 71, including but not limited to a mechanical shear, a heated wire cutter, or a laser cutter. The magazine 71 defines any suitable reservoir or storage container for material yet to be modified or deposited via the cutting mechanism 11 and the deposition nozzle 31 respectively. Consideration is given to various embodiments and operational methods in relation to the use of individual amounts of pre-formed material of uniform dimension as well as a contiguous spool of material that may be fed continuously to the cutting mechanism 11. Further consideration is given to the implementation of material segments comprising any variety of geometric cross-section (e.g. square, rectangular, hexagonal, triangular, circular, etc.) as may be useful to optimize construction of an accurate approximation of a given model. The cutting mechanism 11 further comprises at least one chamber 21, at least one inlet 22, at least one outlet 23, and at least one cutting head 12. The inlet 22 defines a point at which material from the magazine 71 may enter the chamber 21 such that the cutting head 12 may intersect the material as said material traverses the chamber 21. The outlet 23 defines a section of the chamber 21 opposite the inlet 22 wherein finished material is expelled from the chamber 21 to reach the deposition nozzle 31. In the operable configuration of the present invention, the magazine 71 will be in fluid communication with the deposition nozzle 31 via the inlet 22, the cutting head 12, and the outlet 23.

Figure 8:
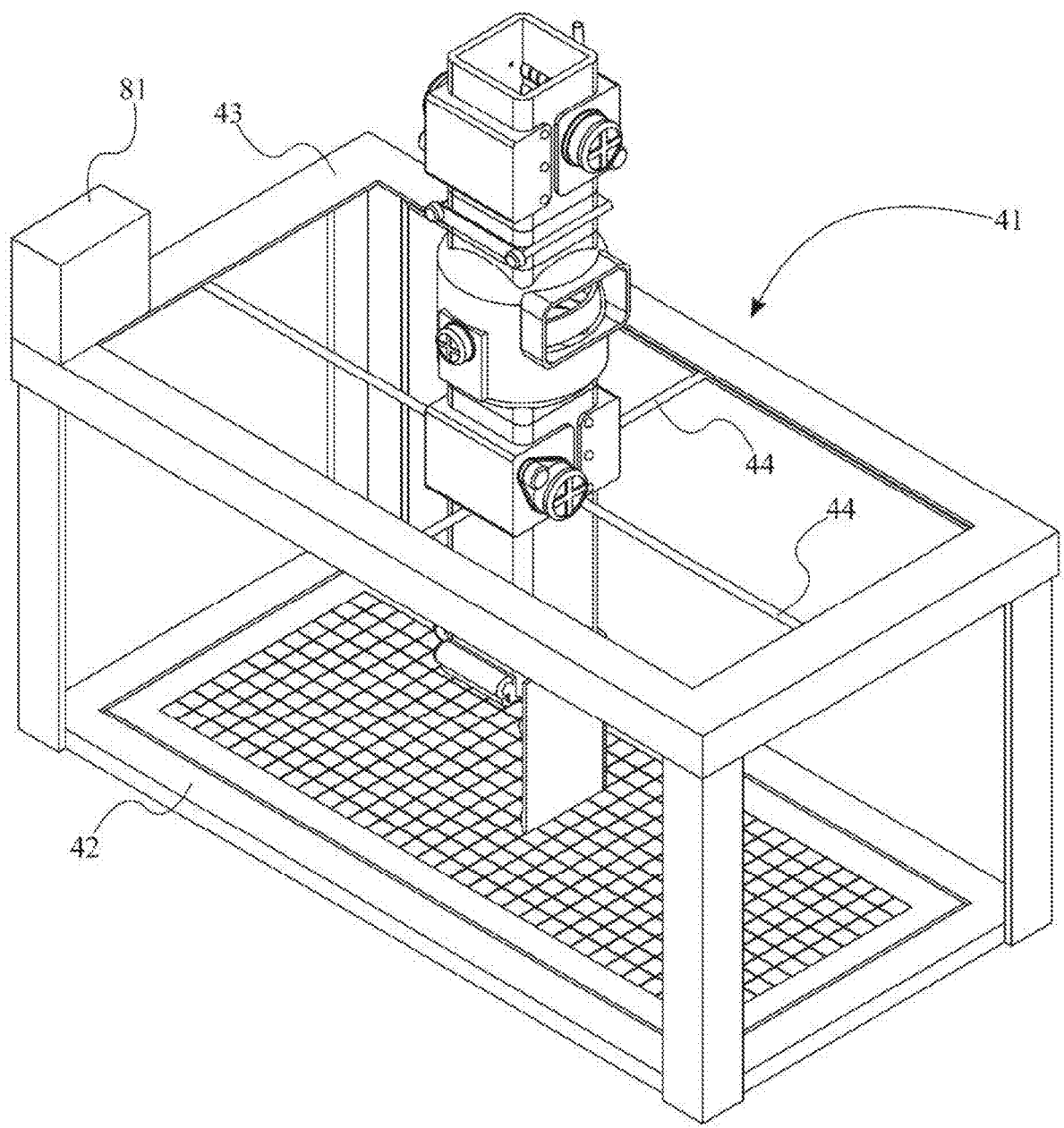
FIG. 8 is a perspective view of the present invention; wherein a platform is shown.
Figure 9:
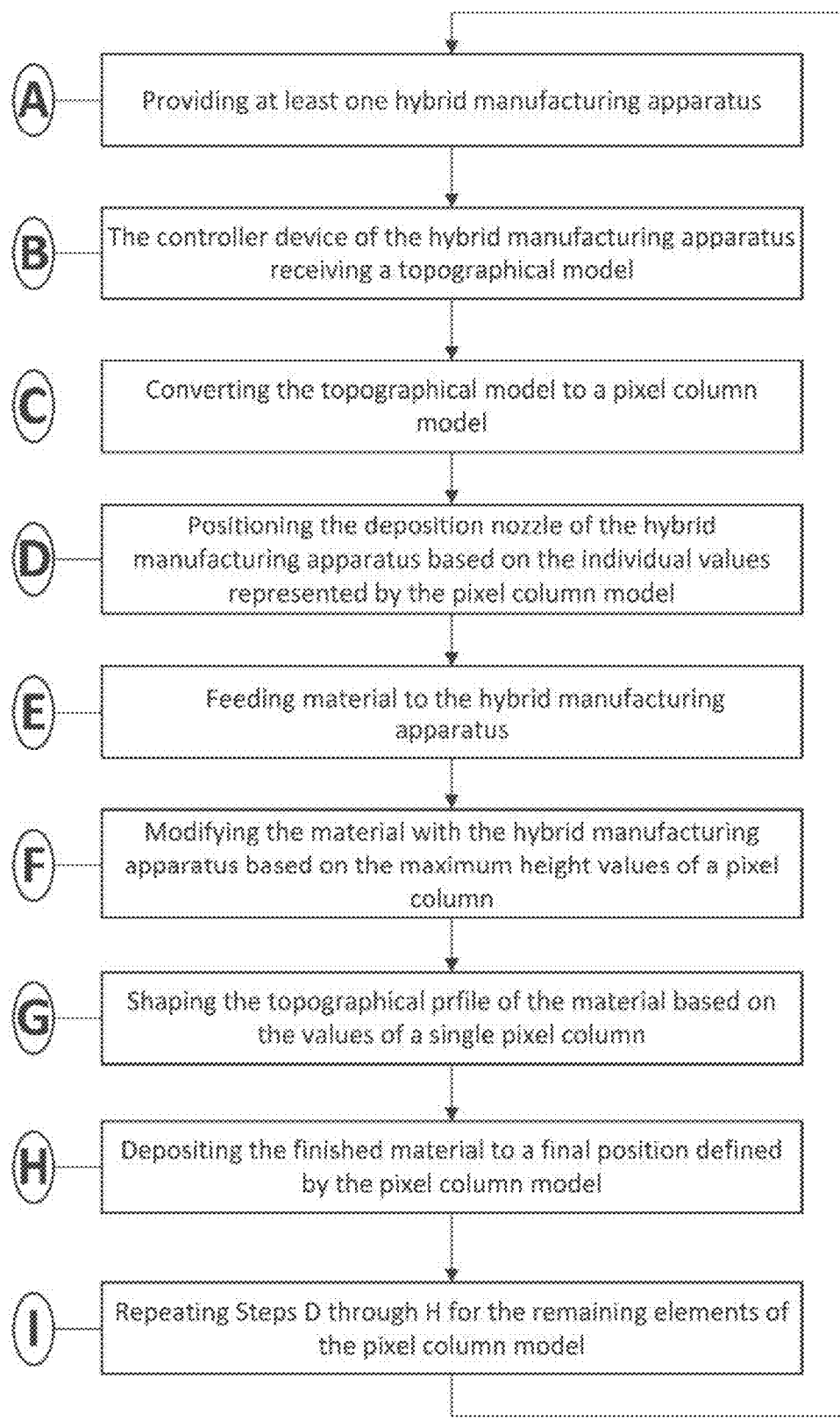
FIG. 9 is a simplified flow diagram outlining the preferred operational method of the present invention.
Figure 10:
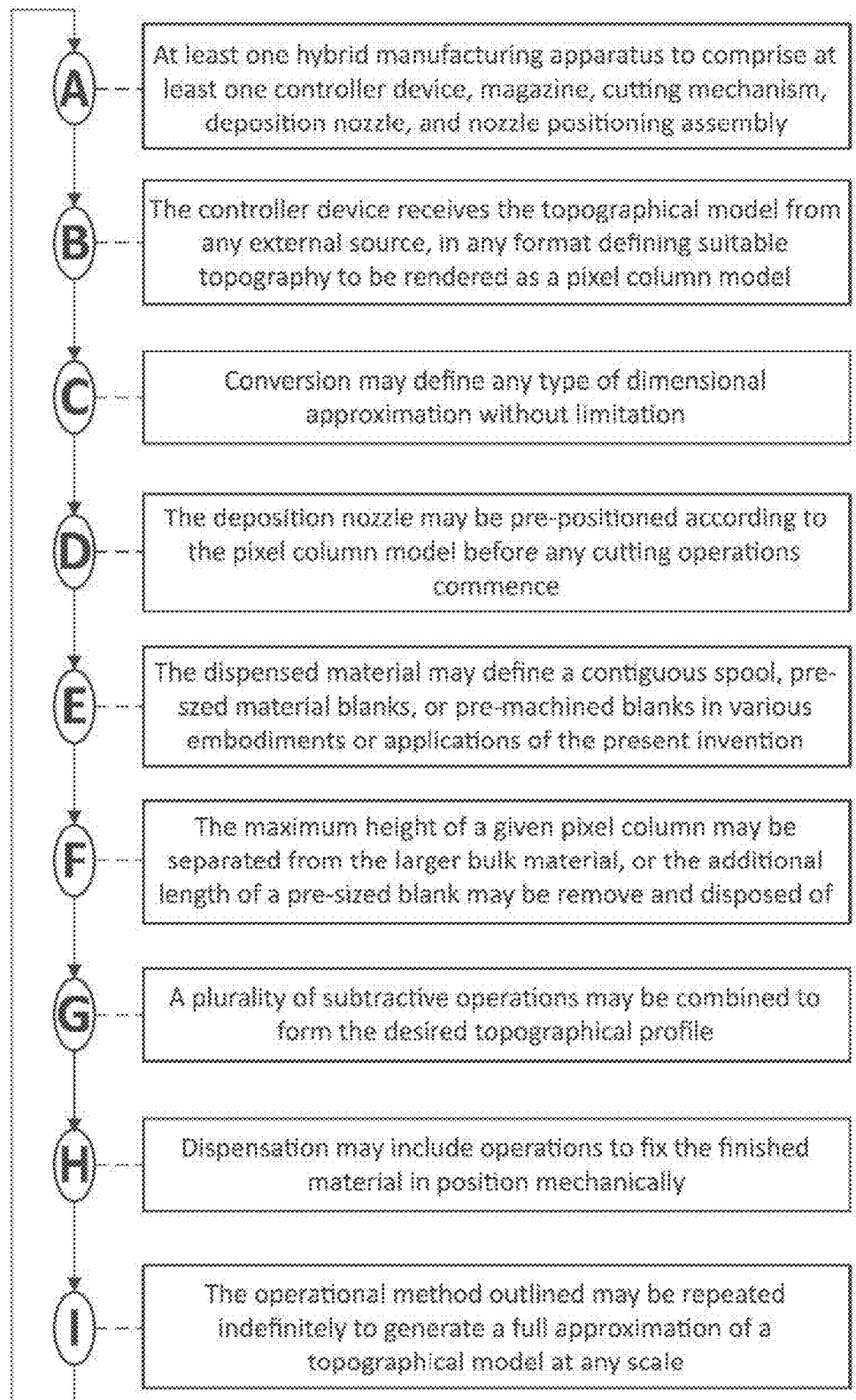
FIG. 10 is a simplified flow diagram detailing the individual steps of the operational method of the present invention.
Figure 11:
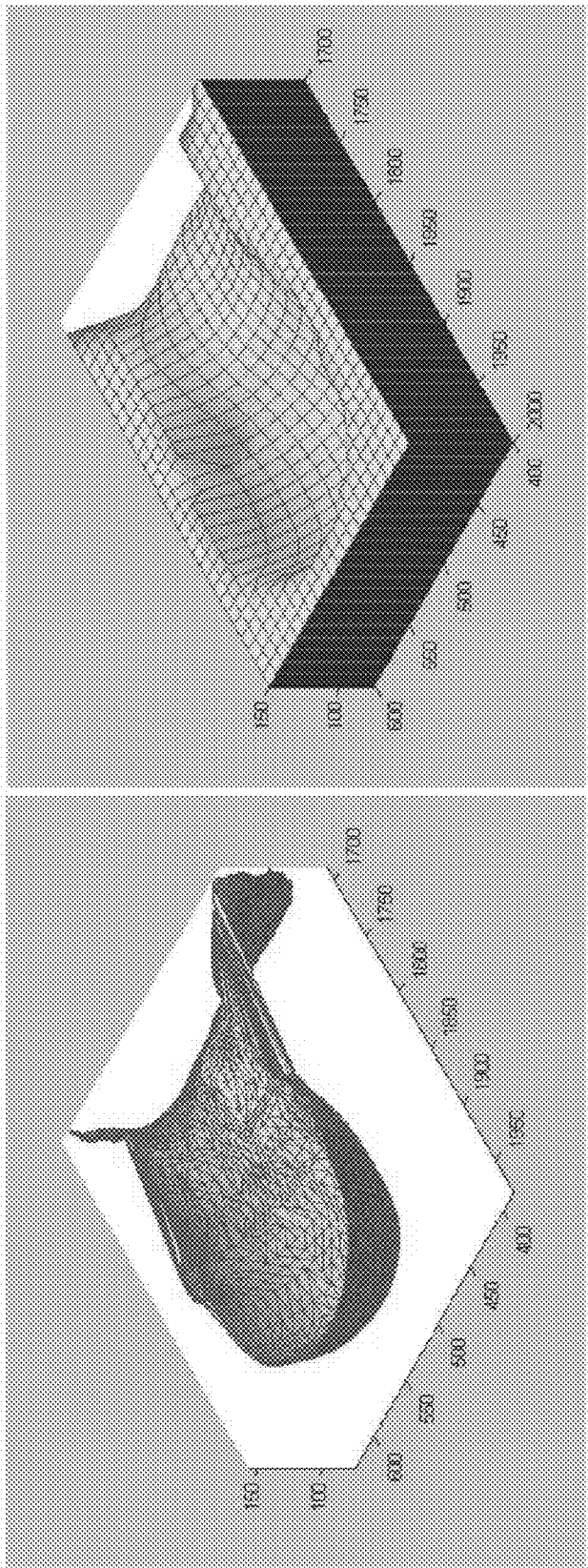
FIG. 11 is a diagram outlining the process of approximating a stereolithography (STL) model with a pixel column model.
Figure 12:
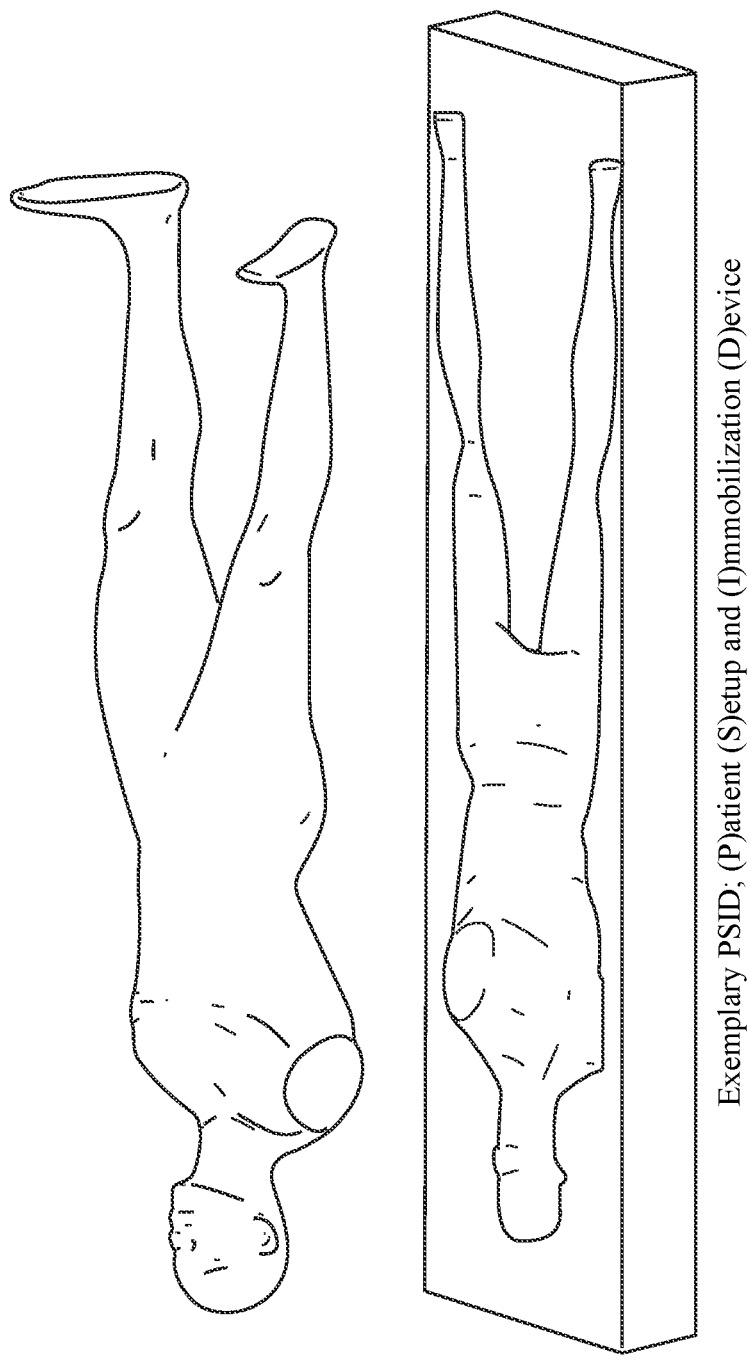
FIG. 12 is depiction of an exemplary product of the present invention, explained in relation to a contemplated application in the field of medical manufacturing.

In reference to FIG. 1, FIG. 3, and FIG. 8, the hybrid manufacturing apparatus is further contemplated to comprise a platform 41 comprising a build plate 42, a gantry 43, and a nozzle positioning assembly 44. The build plate 42 is a planar surface of suitable material quality to receive and support the material modified by the cutting mechanism 11 and dispensed from the deposition nozzle 31. The gantry 43 provides a rigid superstructure fixed in relation to the build plate 42, defining the axes which the deposition nozzle 31 may traverse. The nozzle positioning assembly 44 may be any form or combination of motors, actuators, or other motive devices of suitable type and configuration to advance the deposition nozzle 31 to a position defined by grid coordinates corresponding to a pixel column model, said model having been converted to machine instructions recognizable by an individual of ordinary skill as numerical control (NC) programming language. In the preferred operational method, subsequent grid squares will be filled based on an incremental value of X for a given coordinate system of (X, Y) until the maximum value of X has been reached, wherein the Y value will be incremented. By this process, the deposition nozzle 31 will advance to and fill grid squares immediately adjacent to the preceding grid square. Thus, ensuring that the deposited material will not deform or deflect from a desirable position.

In reference to FIG. 1 and FIG. 8, in at least one embodiment, the cutting mechanism 11 is mounted between the deposition nozzle 31 and the gantry 43. In various alternate embodiments, the cutting mechanism 11 and the magazine 71 are individually mounted to the gantry 43 as either fixed or mobile structures as may be dictated by constraints on configuration and form factor without departing from the scope of the present invention.

In reference to FIG. 1 and FIG. 3, it is additionally considered that an output conduit 32 and a guide plate 37 are integral to the hybrid manufacturing apparatus. The output conduit 32 defines a hollow space traversing the length of the deposition nozzle 31, wherein the output conduit 32 is in fluid communication with the outlet 23 of the chamber 21. The guide plate 37 ideally defines a rigid contoured protrusion beyond the output conduit 32 opposite the cutting mechanism 11. The guide plate 37 is contemplated to channel instances of completed material into an appropriate position relative to the grid squares designated by the positioning instructions informing the operation of the nozzle positioning assembly 44. Further consideration is given to instances wherein the guide plate 37 may be utilized to manually shift material on the build plate based on a counter-advance movement command executed after the deposition of a segment of material, whereby the most recently deposited material at (X,Y) will be forced into alignment with previously deposited material at positions (X−d, Y) and (X, Y−d); wherein d is equal to the lateral dimensions of a segment of material.

In reference to FIG. 3, the hybrid manufacturing device is further contemplated to comprise a first applicator 33 and a second applicator 34 mounted to the output conduit 32. The first applicator 33 defines a container and application member exposed to the output conduit 32 such that a segment of material traversing the output conduit 32 will receive a layer of adhesive compound. The second applicator 34 defines a similar component arranged opposite the first application, such that two adjacent faces of a segment of material will simultaneously receive a layer of adhesive. It is specifically considered that the first applicator 33 and the second applicator 34 will be positioned on areas of the output conduit 32 disposed towards the X−d and the Y−d directions of the grid, such that only the sides of a segment of material that may be mated to previously deposited material will receive a layer of adhesive. This arrangement will minimize mess and wastage of expendable materials associated with the over-application of adhesive to non-mating faces, thereby minimizing cost and time required for the adhesive to set and cure the segments of material into a single contiguous form.

In reference to FIG. 3, the deposition nozzle 31 is further contemplated to comprise a port 35 and a positive pressure device 36. Embodiments of the present invention are designed with positive pressure devices including, but not limited to a pump, sealed pressure vessel, or any other means of delivering pneumatic pressure to the port 35 without limitation. The positive pressure device 36 is in fluid communication with the port 35, which is further in fluid communication with the output conduit 32. The port 35 defines an operable valve suitable for introducing jets of pneumatic pressure into the output conduit 32 upon receipt of executable commands from at least one controller device. The pressurized air introduced, not the output conduit 32, will ideally eject a segment of material with a faceted face at force through the first applicator 33 and the second applicator 34 and into position on the build plate.

In reference to FIG. 1, FIG. 4, FIG. 6, and FIG. 7, the at least one cutting head 12 further comprises a primary head actuation assembly 13 and a primary cutter 14. The primary head actuation assembly 13 is ideally fixed to the chamber 21 such that the primary cutter 14 may be repositioned within the chamber 21, specifically relative to the inlet 22 and any incoming material. In the preferred embodiment, the primary head actuation assembly 13 will achieve at least two degrees of freedom within the chamber 21 such that the primary cutter 14 may be drawn across the segment of material to create the faceted face. These degrees of freedom are ideally contemplated to be achieved via the combination of both lateral and transverse fields of movement, enabling the primary cutter 14 to engage the segment of material at any angle as directed by the controller device. The specific dimensions of the faceted face are defined by the value Z and the vector norm (nX, nY, 1); wherein Z defines the height of a given pixel column. Further, (X, Y) defines the grid position of the pixel column relative to the build plate at a point defined within said pixel column. The primary head actuation assembly 13 will position the primary cutter 14 to traverse the plane defined along the vector norm defined by (nX, nY, 1), thereby creating the faceted face in the segment of material according to an approximation of a section of a curved surface as established and rationalized by the controller device.

Figure 7:
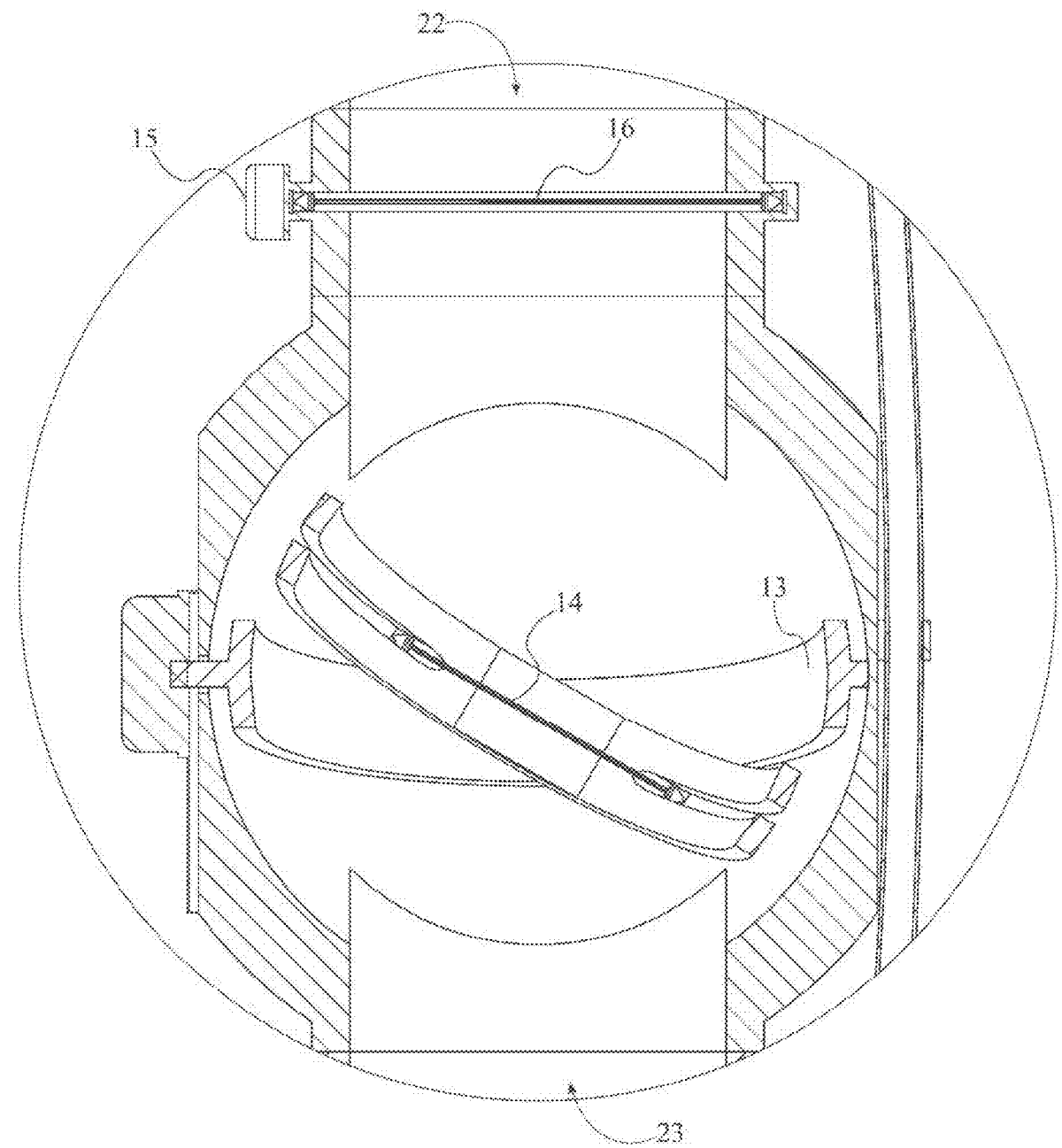
FIG. 7 is a detail view of area 7 in FIG. 6.

In reference to FIG. 7, in another instance, the at least one cutting head further comprises a secondary head actuation assembly 15 and a secondary cutter 16. It is contemplated that the secondary head actuation assembly 15 and secondary cutter 16 operate cooperatively with the primary head actuation assembly 13 and primary cutter 14 to more efficiently and expediently establish final dimensions for the segment of material. The secondary head actuation assembly 15 may, in one instance, draw the secondary cutter 16 laterally across a plane parallel to the build plate to establish the finished height, h, prior to creating the faceted face as described above. This alternate embodiment may also be configured to sever an appropriate length of material to create the segment of material of known length in embodiments wherein contiguous build material is fed into the hybrid manufacturing apparatus.

Figure 13:
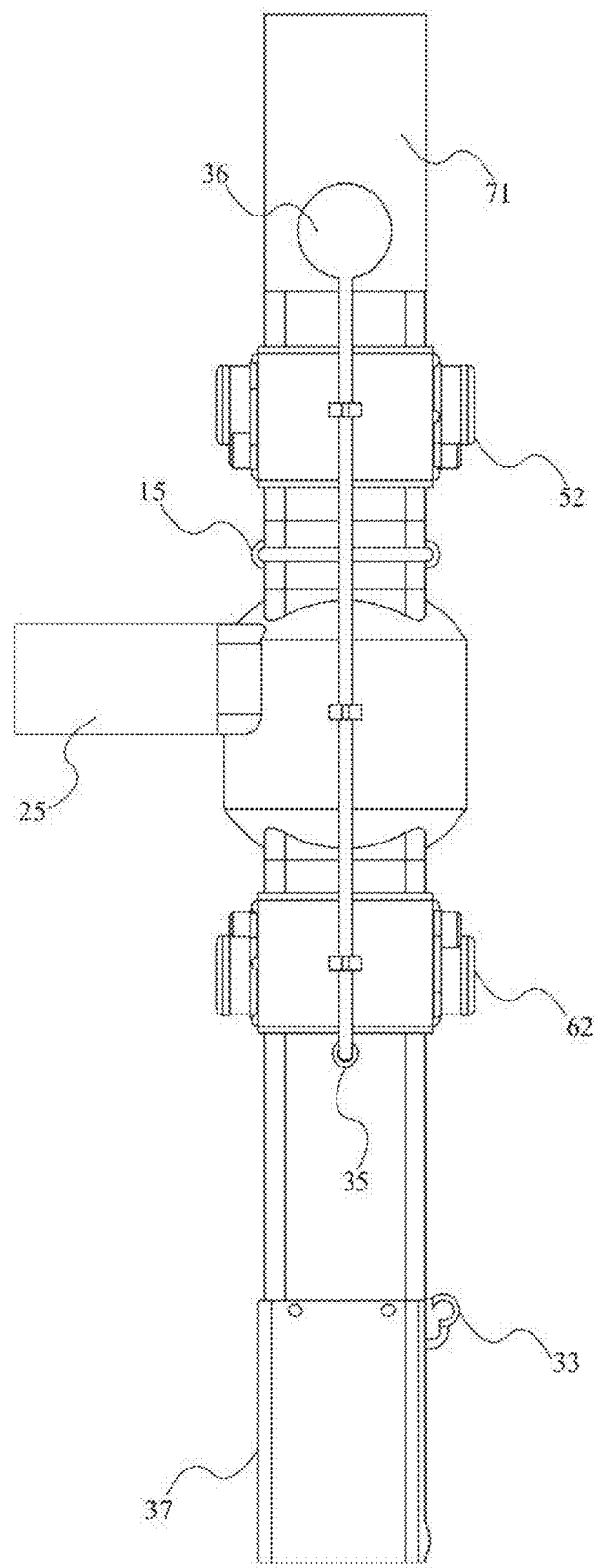
FIG. 13 is a left-side elevational view of the present invention.

In reference to FIG. 1, through FIG. 13, in further embodiments, the hybrid manufacturing apparatus comprises a disposal chute 24 and a negative pressure device 25. The disposal chute 24 is ideally integral to the chamber 21, such that the negative pressure device 25 is in fluid communication with the chamber 21 via the disposal chute 24. The disposal chute 24 is further considered to define an operable portal, said operation to coincide with the production of vacuum from the negative pressure device 25. The operation of the disposal chute 24 is contemplated to enable the mid-production disposal of any offcut material resulting from the creation of the faceted face by the primary cutter 14 and/or the secondary cutter 16. The waste material is understood to pose a hazard to the first head actuator assembly and the second head actuator assembly in the event that any quantity of material becomes lodged in the pinch points or shear areas of these mobile assemblies.

In reference to FIG. 1, FIG. 3, FIG. 4, and FIG. 6, the hybrid manufacturing apparatus further comprises a feed conduit 51 and a feed conveyor 52; wherein the feed conduit 51 is connected between the inlet 22 of the chamber 21 and the magazine 71. The feed conveyor 52 will be positioned within the feed conduit 51 adjacent to the inlet 22, such that any material entering the feed conduit 51 may be manipulated by the feed conveyor 52 to effect entry into the chamber 21. In one instance, the feed conveyor 52 is a series of driven rollers arranged at opposite faces of the feed conduit 51. In this instance, the feed conveyor 52 provides a means of advancing or retracting the segment of material to an appropriate position relative to the primary cutter 14 or the secondary cutter 16. For example, the feed conveyor 52 may advance the segment of material a predetermined length such that the terminal end of the segment of material has traversed the secondary cutter 16, whereby the secondary cutter 16 may sever the segment of material to establish the maximum height of the segment.

In addition, the hybrid manufacturing apparatus may comprise a transfer conduit 61 and a transfer conveyor 62; wherein the transfer conduit 61 is connected between the outlet 23 of the chamber 21 and the deposition nozzle 31. In at least one embodiment, the transfer conduit 61 and the transfer conveyor 62 will define similar structures and assemblies to the feed conduit 51 and the feed conveyor 52. It is further considered that the feed conveyor 52 may operate cooperatively with the transfer conveyor 62, i.e. that the segment of material may be received and advanced by the feed conveyor 52 across the chamber 21 to be received by the transfer conveyor 62. By this method, the feed conveyor 52 and the transfer conveyor 62 may advance the segment of material in opposite directions to apply tension to the segment of material to enable more effective cutting operations by the primary cutter 14 and the secondary cutter 16. It is also contemplated that the position of the segment of material relative to the secondary cutter 16 and the primary cutter 14 may be adjusted by advancing or reversing the feed conveyor 52 and the transfer conveyor 62 in conjunction.

In reference to FIG. 9 through FIG. 12, in relation to the described apparatus, a preferred hybrid manufacturing method is contemplated to provide a means of producing a structure at speeds superior to conventional means and methods. Specifically, the preferred method considers the usage of the hybrid manufacturing apparatus comprising at least one controller device 81, at least one cutting mechanism 11, at least one deposition nozzle 31, and at least one nozzle positioning assembly 44 (Step A). The controller device 81 receives at least one topographical model (STEP B). Accordingly, the proto-model is transferred to the controller device 81 and prepared for processing. The method continues by subdividing the contiguous topographical model into a plurality of similar pixel column structures arranged on a coordinate plane (Step C). Each instance of the pixel columns defines a construct containing a grid position, a pixel height, and a topographical profile. The grid position is ideally defined by the coordinates (X, Y) as outlined previously, wherein the pixel height may be defined as Z. The topographical profile is ideally defined via the establishment of a vector norm between points (nX, nY, h) and (X, Y, Z) as previously described. To begin the production of a physical model conforming to the topographical model, the deposition nozzle 31 is moved to a position corresponding to the grid position of an arbitrary pixel column by the nozzle positioning assembly 44 (Step D). Subsequently, the column of material will be dispensed from the magazine 71 into the cutting mechanism 11 (Step E). The column of material may comprise a contiguous material stored in bulk within the magazine 71 or may define a segment of material of uniform size in various implementations of the present invention (Step F). The method continues by having the cutting mechanism 11 engage the column of material, modifying the column of material to the conform to the pixel height and topographical profile of the arbitrary pixel column (Step G). In various contemplated implementations of the present method, the topographical profile may define multiple coincident planes or other surface contours necessitating multiple planar or non-planar cut operations without departing from the scope or spirit of the invention. After engaging the cutting mechanism 11, the finished instance of the column of material enters the deposition nozzle 31, and the column of material is dispensed to the grid position defined by the arbitrary pixel column (Step H). The method outlined herein may then be repeated for subsequent iterations defined within the plurality of pixel columns until a structure conforming to an approximation of the original topographical model is produced, i.e. when every grid position has been filled with a column of material conforming to corresponding pixel columns (Step I).

Although the invention has been explained in relation to its preferred embodiment, it is to be understood that many other possible modifications and variations can be made without departing from the spirit and scope of the invention as hereinafter claimed.

What is claimed is:

1. A hybrid manufacturing apparatus comprising:
   at least one cutting mechanism;
   at least one magazine;
   at least one deposition nozzle;
   the at least one cutting mechanism comprising at least one chamber, at least one inlet, at least one outlet, and at least one cutting head;
   the at least one cutting head comprising a primary head actuation assembly, a primary cutter, a secondary head actuation assembly, and a secondary cutter;
   the at least one inlet being integrated into the at least one chamber;
   the at least one outlet being integrated into the at least one chamber;
   the at least one outlet being positioned offset from the at least one inlet across the at least one chamber;
   the at least one cutting head being mounted within the at least one chamber;
   the at least one cutting head being positioned in between the at least one inlet and the at least one outlet;
   the at least one magazine being in fluid communication with the at least one inlet;
   the deposition nozzle being in fluid communication with the at least one outlet;
   the at least one magazine being in fluid communication with the deposition nozzle through the at least one inlet, the at least one cutting head, and the at least one outlet;
   the primary head actuation assembly being mounted within the at least one chamber;
   the primary cutter being operatively coupled to the primary head actuation assembly, wherein the primary head actuation assembly repositions the primary cutter relative to the at least one inlet;
   the secondary head actuation assembly being mounted within the at least one chamber;
   the secondary head actuation assembly being positioned offset from the primary head actuation assembly, across the at least one chamber; and
   the secondary cutter being operatively coupled to the secondary head actuation assembly, wherein the secondary head actuation assembly repositions the secondary cutter relative to the at least one inlet.

2. The hybrid manufacturing apparatus as claimed in claim 1 comprising:
   a platform comprising a build plate, a gantry, and a nozzle positioning assembly;
   the gantry being mounted adjacent to the build plate;
   the nozzle positioning assembly being mounted onto the gantry;
   the nozzle positioning assembly being positioned offset from the build plate across the gantry; and
   the deposition nozzle being operatively coupled to the nozzle positioning assembly, wherein the nozzle positioning assembly repositions the deposition nozzle relative to the build plate.

3. The hybrid manufacturing apparatus as claimed in claim 2 comprising:
   the at least one cutting mechanism being mounted in between the deposition nozzle and the gantry.

4. The hybrid manufacturing apparatus as claimed in claim 1 comprising:
   an output conduit;
   a guide plate;
   the output conduit traversing through the deposition nozzle;
   the output conduit being in fluid communication with the at least one outlet; and
   the guide plate being mounted adjacent to the deposition nozzle, opposite to the at least one cutting mechanism.

5. The hybrid manufacturing apparatus as claimed in claim 4 comprising:
   a first applicator;
   a second applicator;
   the first applicator being laterally mounted onto the output conduit;
   the first applicator being positioned offset from the at least one cutting mechanism, across the output conduit;
   the second applicator being laterally mounted onto the output conduit;
   the second applicator being positioned offset from the at least one cutting mechanism, across the output conduit; and
   the second applicator being angularly offset from the first applicator around the output conduit.

6. The hybrid manufacturing apparatus as claimed in claim 4 comprising:
   a port;
   a positive pressure device;
   the port being integrated into the deposition nozzle;
   the port being positioned offset from the at least one outlet across the deposition nozzle;

the port being in fluid communication with the output conduit; and the positive pressure device being in fluid communication with the output conduit through the port.

7. The hybrid manufacturing apparatus as claimed in claim 1 comprising:
   a disposal chute;
   a negative pressure device;
   the disposal chute being integrated into the at least one chamber;
   the disposal chute being in fluid communication with the at least one chamber; and
   the negative pressure device being in fluid communication with the at least one chamber through the disposal chute.

8. The hybrid manufacturing apparatus as claimed in claim 1 comprising:
   a feed conduit;
   a feed conveyor;
   the feed conduit being connected in between the at least one inlet and the at least one magazine;
   the feed conveyor being mounted within the feed conduit; and
   the feed conveyor being positioned adjacent to the at least one inlet.

9. The hybrid manufacturing apparatus as claimed in claim 1 comprising:
   a transfer conduit;
   a transfer conveyor;
   the transfer conduit being connected in between the at least one outlet and the deposition nozzle;
   the transfer conveyor being mounted within the transfer conduit; and
   the transfer conveyor being positioned adjacent to the at least one outlet.

10. The hybrid manufacturing apparatus as claimed in claim 1 comprising:
    at least one controller device;
    at least one nozzle positioning assembly;
    the hybrid manufacturing apparatus being configured for performing steps of:
    (A) receiving at least one topographical model with the at least one controller device;
    (B) subdividing the topographical model into a coordinate plane with the at least one controller device, in order to produce a plurality of pixel columns, wherein each of the plurality of pixel columns includes a grid position, a pixel height, and a topographical profile;
    (C) moving the deposition nozzle into a grid position of an arbitrary column from the plurality of pixel columns with the at least one nozzle positioning assembly;
    (D) dispensing a column of material from the at least one magazine into the at least one cutting mechanism;
    (E) cutting the column of material with the at least one cutting mechanism, such that a length of the column of material is equal to a pixel height of the arbitrary column;
    (F) reshaping the column of material to conform to a topographical profile of the arbitrary column with the at least one cutting mechanism;
    (G) dispensing the column of material onto the grid position of the arbitrary column with the deposition nozzle; and
    (H) repeating steps C through G for each of the plurality of pixel columns.

11. A hybrid manufacturing method comprising:
    (A) providing the at least one hybrid manufacturing apparatus as claimed in claim 1, wherein the hybrid manufacturing apparatus further comprises at least one controller device and at least one nozzle positioning assembly;
    (B) receiving at least one topographical model with the at least one controller device;
    (C) subdividing the topographical model into a coordinate plane with the at least one controller device, in order to produce a plurality of pixel columns, wherein each of the plurality of pixel columns includes a grid position, a pixel height, and a topographical profile;
    (D) moving the deposition nozzle into a grid position of an arbitrary column from the plurality of pixel columns with the at least one nozzle positioning assembly;
    (E) dispensing a column of material from the at least one magazine into the at least one cutting mechanism;
    (F) cutting the column of material with the at least one cutting mechanism, such that a length of the column of material is equal to a pixel height of the arbitrary column;
    (G) reshaping the column of material to conform to a topographical profile of the arbitrary column with the at least one cutting mechanism;
    (H) dispensing the column of material onto the grid position of the arbitrary column with the deposition nozzle; and
    (I) repeating steps D through H for each of the plurality of pixel columns.

\* \* \* \* \*